US011959304B1

(12) United States Patent
Chiang

(10) Patent No.: US 11,959,304 B1
(45) Date of Patent: Apr. 16, 2024

(54) LOCK ASSEMBLY FOR A DOOR OF A DISTRIBUTION BOX

(71) Applicant: ASMITH MANUFACTURING COMPANY, Taichung (TW)

(72) Inventor: Ching-Hua Chiang, Taichung (TW)

(73) Assignee: ASMITH MANUFACTURING COMPANY, Taichung (TW)

(*) Notice: Subject to any disclaimer, the term of this patent is extended or adjusted under 35 U.S.C. 154(b) by 0 days.

(21) Appl. No.: 17/955,751

(22) Filed: Sep. 29, 2022

(51) Int. Cl.
*E05B 15/04* (2006.01)
*E05B 65/02* (2006.01)

(52) U.S. Cl.
CPC ...... *E05B 15/04* (2013.01); *E05B 2015/0431* (2013.01); *E05B 65/02* (2013.01)

(58) Field of Classification Search
CPC ..... E05B 2015/0431; E05B 2015/0441; E05B 2015/0437; E05B 9/08; E05B 9/00; E05B 63/0056; E05B 63/006; E05B 65/0089; E05B 65/02; E05B 15/04; Y10S 292/60; Y10S 292/61; Y10S 70/53; Y10S 70/54; Y10T 70/8838
See application file for complete search history.

(56) References Cited

FOREIGN PATENT DOCUMENTS

WO WO-2005071191 A1 * 8/2005 ............... E05B 9/08

* cited by examiner

*Primary Examiner* — Christine M Mills
*Assistant Examiner* — Yahya Sidky
(74) *Attorney, Agent, or Firm* — Best & Flanagan LLP

(57) ABSTRACT

A lock assembly includes a lock, a pre-loadable mount and an adjusting element. The lock includes a shell formed with two bores and a hole. The pre-loadable mat t includes a yoke, two bent rods extending from the yoke, and two pivots respectively extending from the bent rods, wherein the pivots are respectively inserted in the bores. The adjusting element includes a first section inserted in the hole and a second section placed against the yoke so that the bent rods are located against a rear face of the door while a portion of the shell is placed against a front face of the door.

3 Claims, 6 Drawing Sheets

LOCK ASSEMBLY FOR A DOOR OF A DISTRIBUTION BOX

BACKGROUND OF INVENTION

1. Field of Invention

The present invention relates to a door of a distribution box and, more particularly, to a lock assembly for a door of a distribution box.

2. Related Prior Art

Referring to FIGS. 5 and 6, a conventional lock assembly 90 is used on a door 91 of a distribution box. The lock assembly 90 includes a lock 95 and a mount 98. The lock 95 includes a frame 92, a button 93, a spring-biased handle 94 and a latch 96. The button 93 is operable to unlock the spring-biased handle 94.

The spring-biased handle 94 is operable to swing the latch 96. The lock 95 is inserted in an opening of the door 91. The button 93 and the spring-biased handle 94 are located in front of the door 91. The latch 96 is located behind the door 91. The frame 92 is located on a front face of the door 91. Two contact portions 99 of the mount 98 are placed against a rear face of the door 91. A middle portion of the mount 98 is connected to the lock 95 by two screws 97. Thus, the door 91 is clamped by the frame 92 and the mount 95, i.e., the lock assembly 90 is connected to the door 91.

However, it is difficult to firmly connect the lock assembly 90 to the door 91 to ensure proper operation of the lock assembly 90. For example, the lock 95 can be slack on the door 91 if the screws 97 are not properly tightened or if the thickness of the door is smaller than a distance between the frame 92 and the contact portions of the mount 98.

The present invention is therefore intended to obviate or at least alleviate the problems encountered in the prior art.

SUMMARY OF INVENTION

It is the primary objective of the present invention to provide a door of a distribution box with a reliable lock assembly.

To achieve the foregoing objective, the lock assembly includes a lock, a pre-loadable mount and an adjusting element. The lock includes a shell formed with two bores and a hole. The pre-loadable mount includes a yoke, two bent rods extending from the yoke, and two pivots respectively extending from the bent rods, wherein the pivots are respectively inserted in the bores. The adjusting element includes a first section inserted in the hole and a second section placed against the yoke so that the bent rods are located against a rear face of the door while a portion of the shell is placed against a front face of the door.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
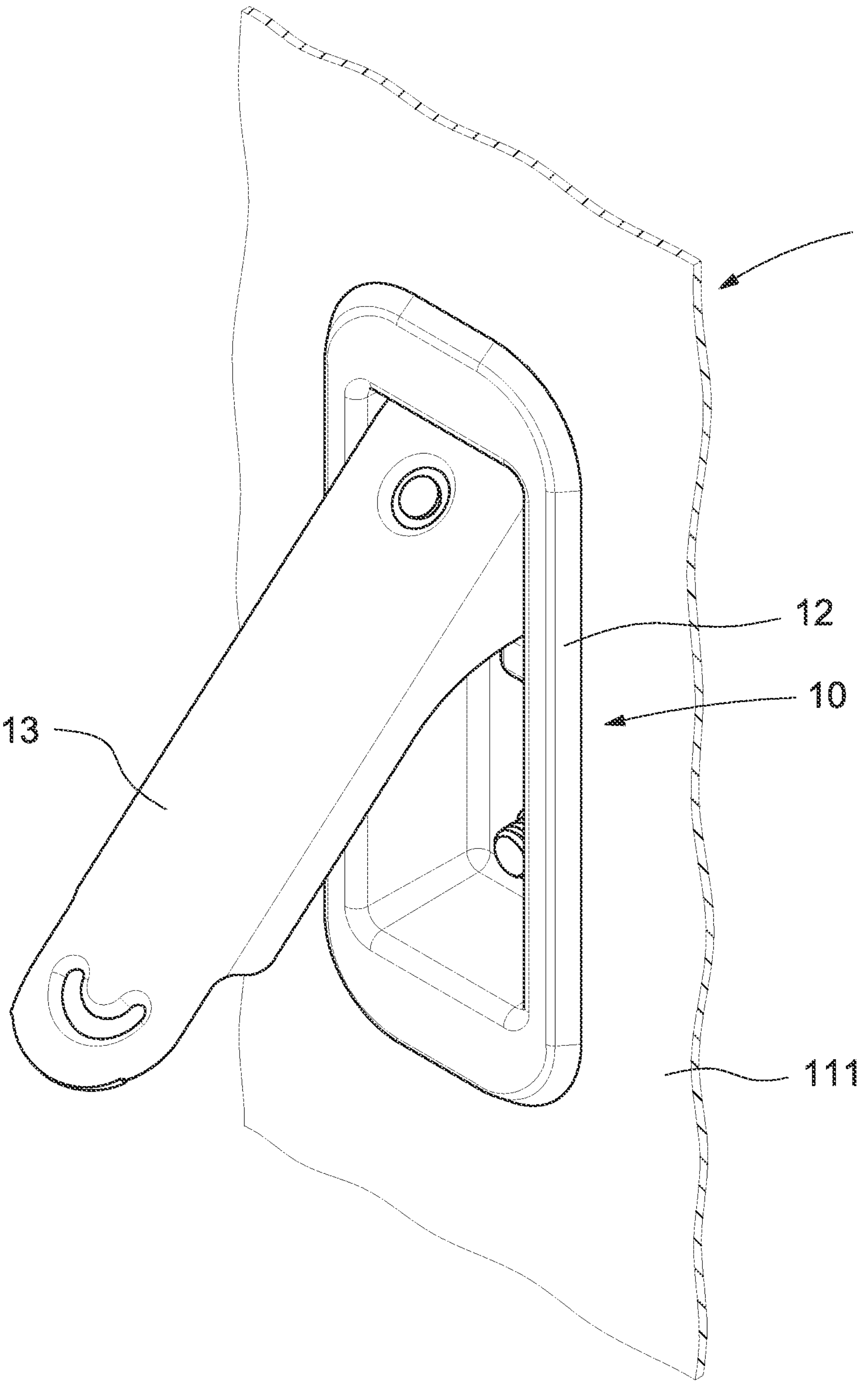
FIG. 1 is a perspective view of a door of a distribution box and a lock assembly according to the preferred embodiment of the present invention.
Figure 2:
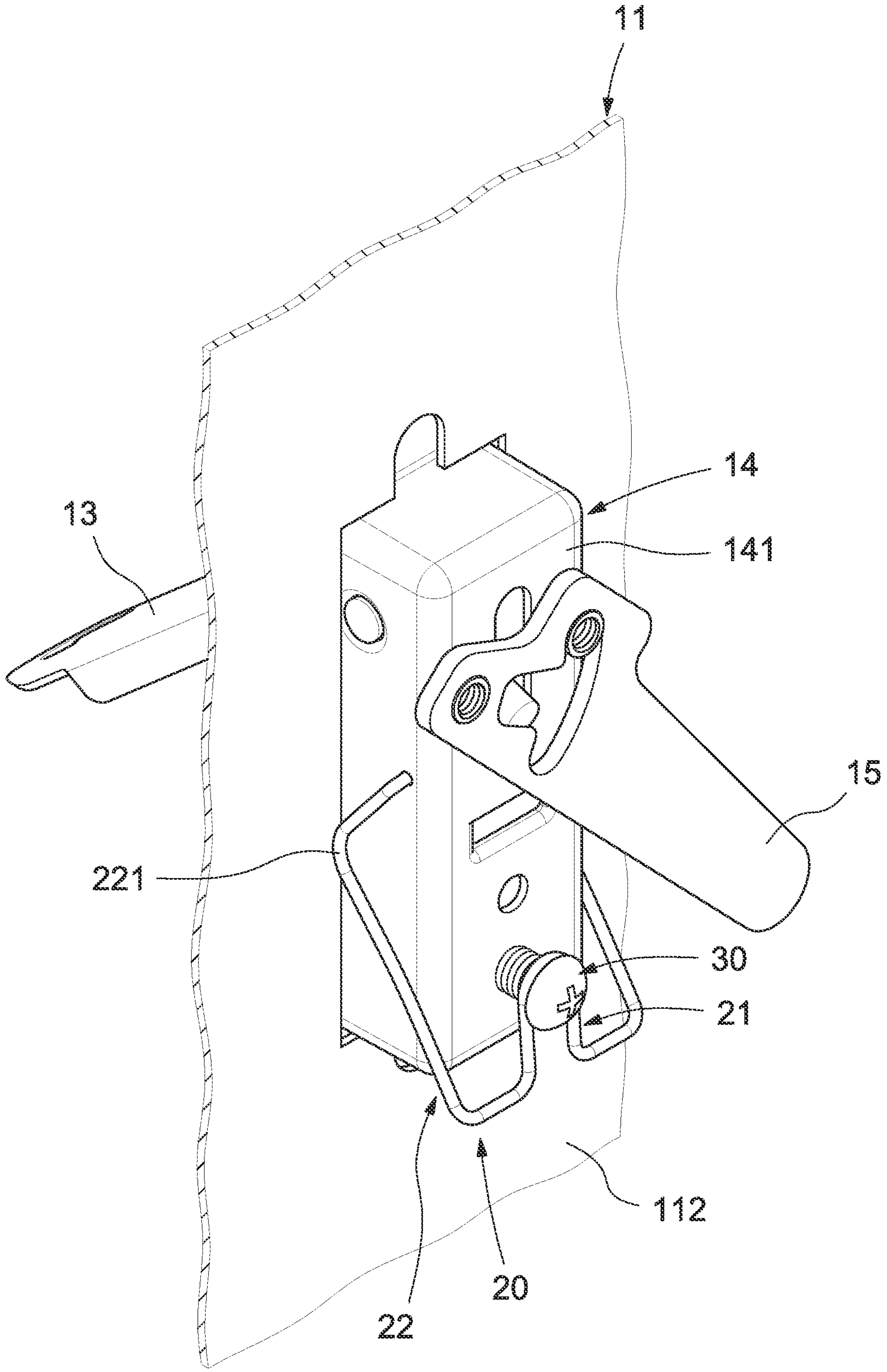
FIG. 2 is another perspective view of the door and the lock assembly shown in FIG. 1.
Figure 3:
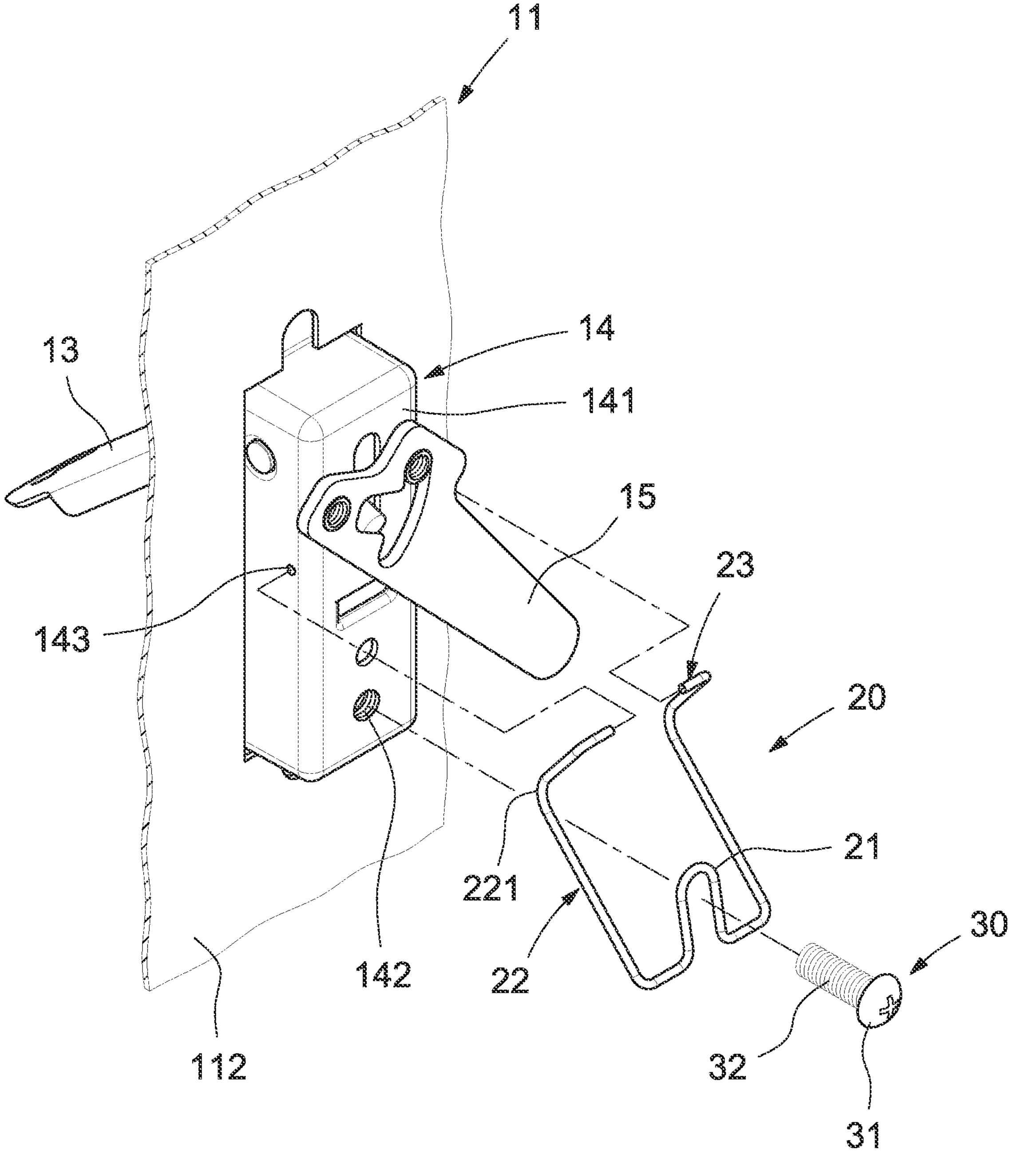
FIG. 3 is an exploded view of the lock assembly shown in FIG. 2.
Figure 4:
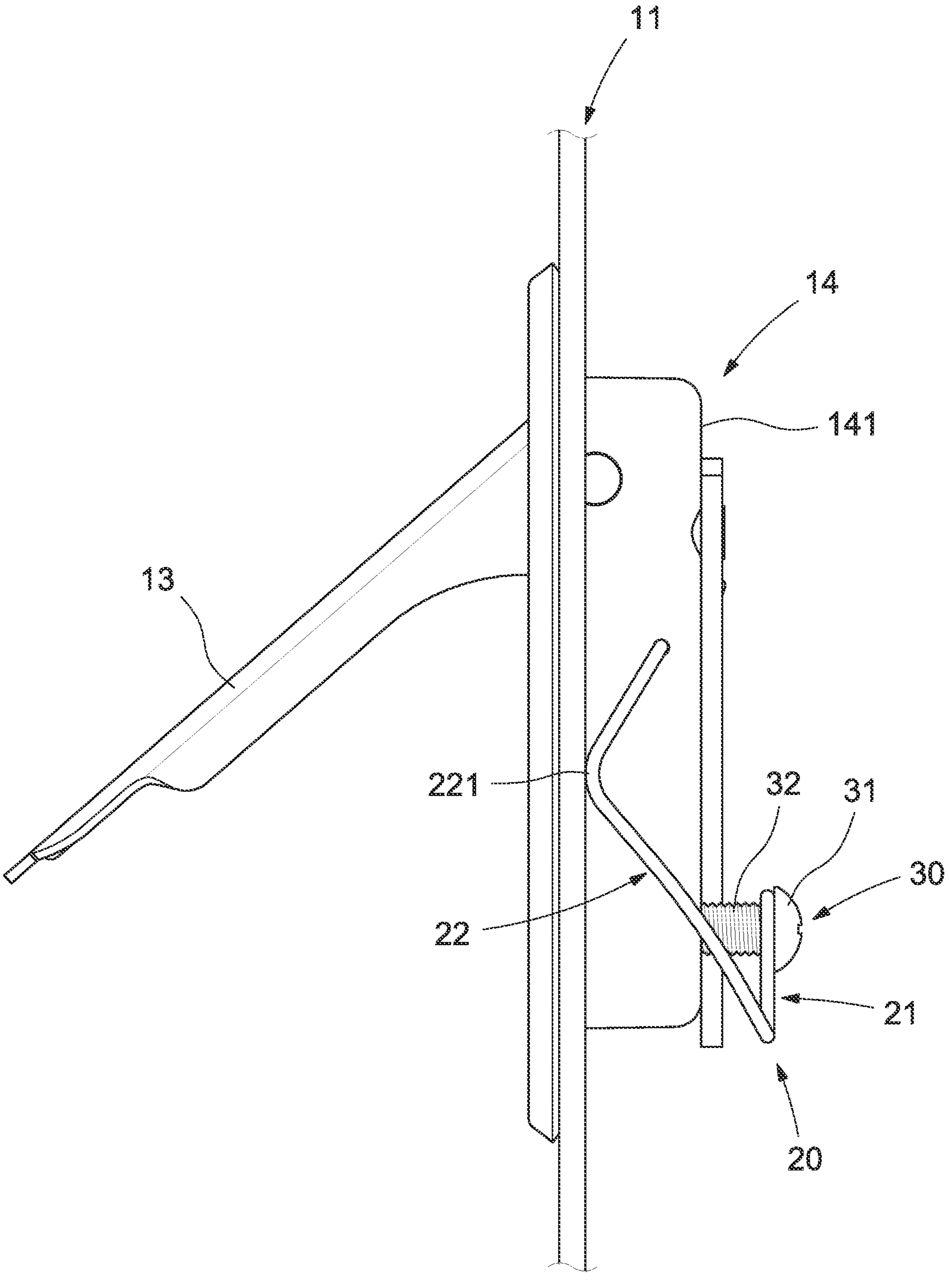
FIG. 4 is a side view of the lock assembly shown in FIG. 1.
Figure 5:
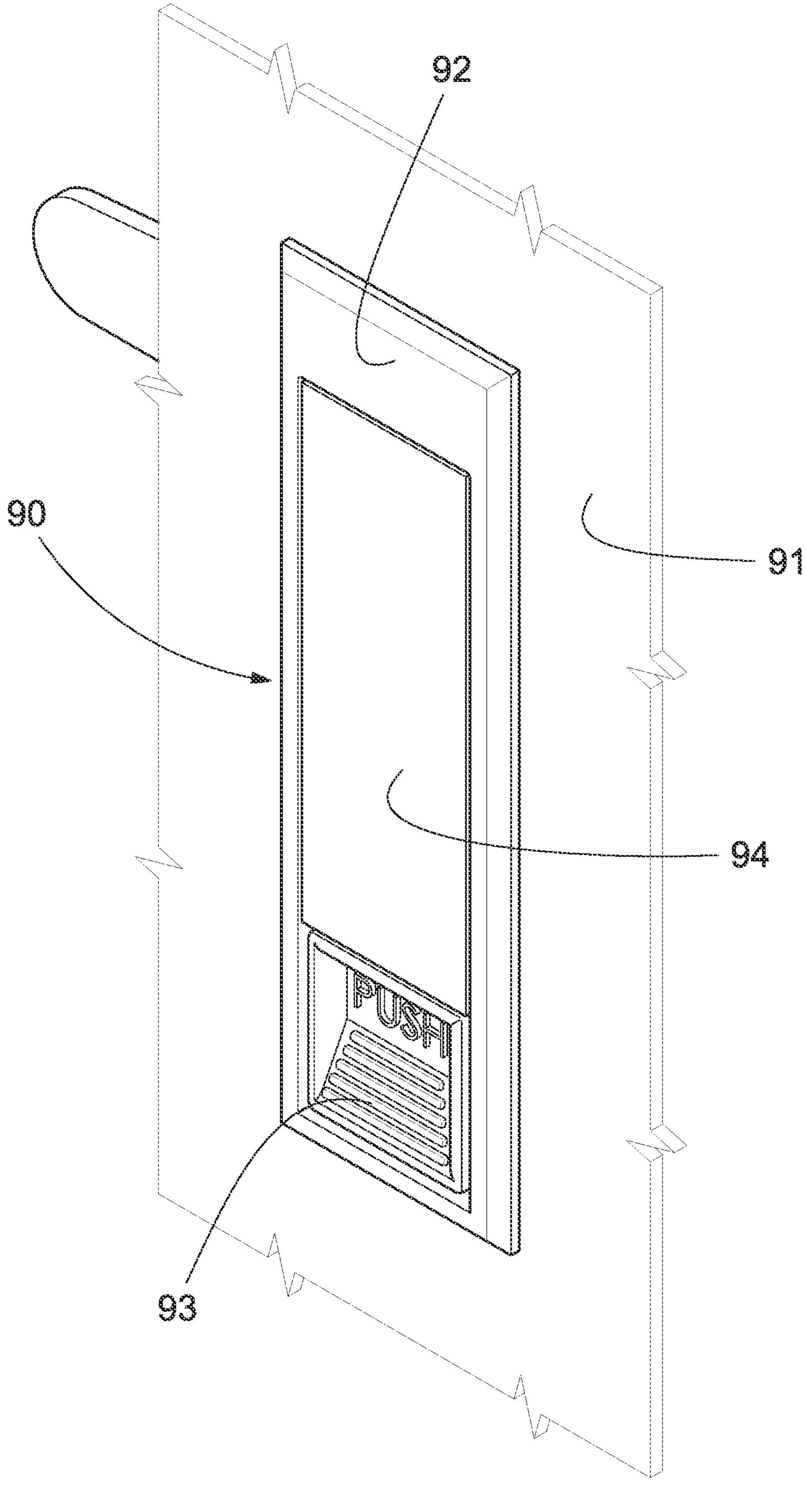
FIG.5 PRIOR ART
FIG. 5 is a perspective view of a door of a distribution box and a conventional lock assembly.
Figure 6:
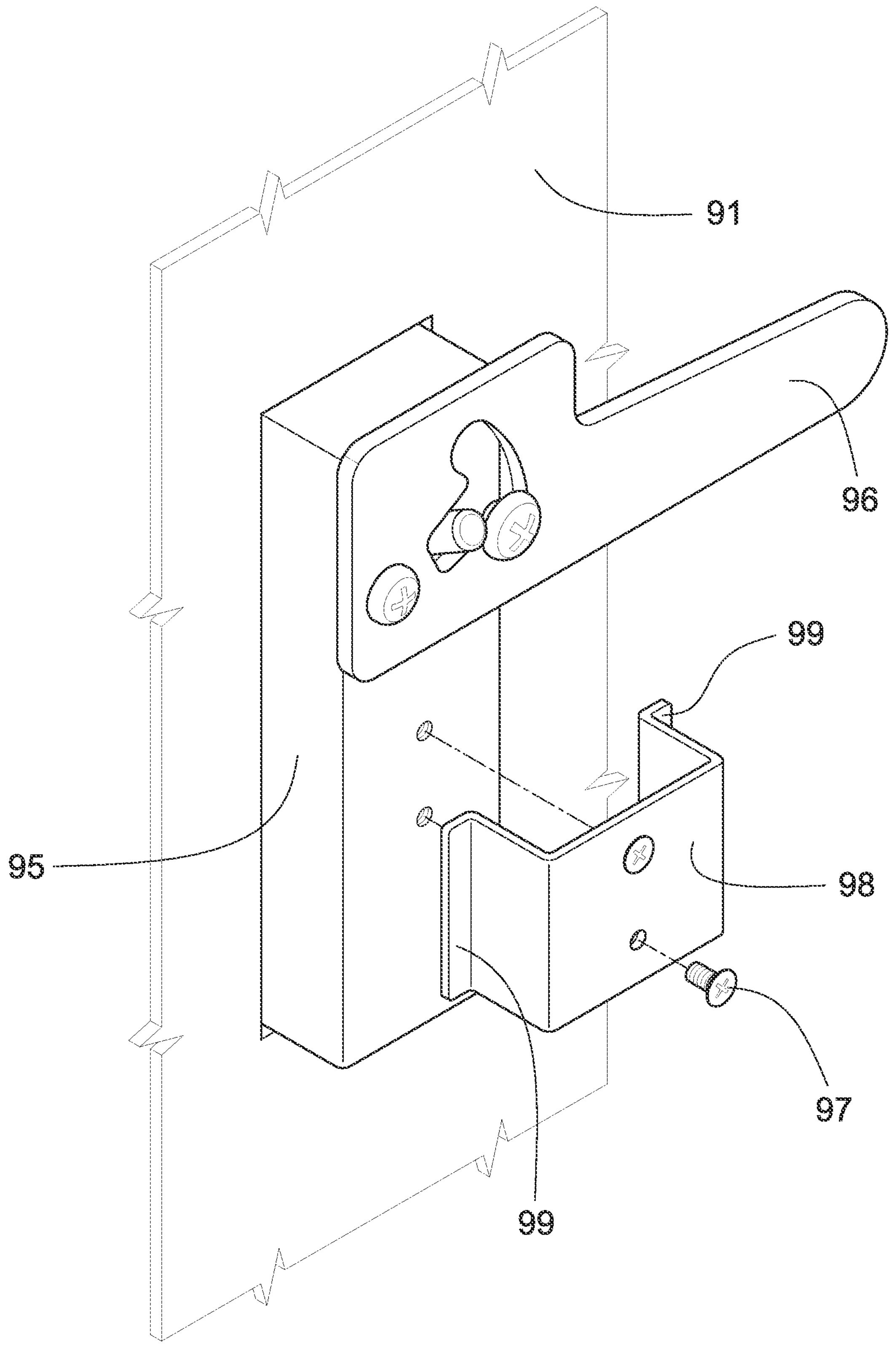
FIG.6 PRIOR ART
FIG. 6 is another perspective view of the door and the lock assembly shown in FIG. 5.

Referring to FIGS. 1 through 4, a door 11 of a distribution is equipped with a lock assembly 10 according to the preferred embodiment of the present invention. The lock assembly 10 includes a lock 14, pre-loadable mount 20 and an adjusting element 30. The lock 14 includes a handle 13 and a latch 15. The handle 13 is operable to swing the latch 15.

The lock 14 further includes a frame 12 extending from and around a shell 141. The shell 14 is located in an opening in the door 11. The frame 12 and the handle 13 are located in front of a front face 111 of the door 11. The latch 15 and a substantial portion of the shell 14 are located behind a rear face 112 of the door 11.

The shell 141 includes a screw hole 142 in a rear portion and two bores 143 in two lateral portions respectively. The bores 143 are coaxial. The screw hole 142 and the bores 143 are located behind the rear face 112 of the door 11.

The pre-loadable mount 20 is formed with a yoke 21, two bent rods 22 and two pivots 23. The yoke 21 is formed between the bent rods 22. The yoke 21 includes an arched section formed between two rectilinear sections.

Each of the bent rods 22 includes an angle 221 between two rectilinear sections. The first section of each of the bent rods 22 transversely extends from one of the rectilinear sections of the yoke 21.

Each of the pivots 23 transversely extends from the second rectilinear section of a corresponding one of the bent rods 22.

In operation, the frame 12 is located on the front face 111 of the door 11. The pivots 23 are inserted in the bores 143 of the shell 141, which is located behind the rear face 112 of the door 11. Thus, the pre-loadable mount 20 is allowed to pivot relative to the lock 14. The angles are located against the rear face 112 of the door 11. Preferably, the adjusting element 30 is a screw including an enlarged head 31 formed at an end of a threaded section 32. The threaded section 32 of the adjusting element 30 is inserted in the screw hole 142 of the shell 141 so that the enlarged head 31 of the adjusting 30 is located against the yoke 21. Thus, the door 11 is clamped by the frame 12 and the mount 20, i.e., the lock 14 is in position relative to the door 11. The tighter is the threaded section 32 of the adjusting element 30 in the screw hole 142, the tighter are the angles 221 against the rear face 112 of the door.

Advantageously, the pre-loadable mount 20 is used as a spring to ensure that the angles 221 of the pre-loadable mount 20 are adequately abutted against the rear face 112 of the door 11 by adequately driving the threaded section 32 of the adjusting element 30 in the screw hole 142 no matter how thick or thin the door 11 is, without any risk of the screw hole 142 bored by the threaded section 32 of the adjusting element 30. Thus, the door 11 is adequately clamped by the frame 12 and the pre-loadable mount 20, i.e., the lock 14 is firmly in position relative to the door 11.

The arched section of the yoke 21 of the pre-loadable mount 20 can be replaced with a circular section or any other section as long as it can bear the enlarged head 31 of the adjusting element 30.

The present invention has been described via the illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A lock assembly for a door, the door having a front face and a rear face, the lock assembly comprising:

a lock comprising:

a frame in front of the front face of the door; and a shell formed with two bores and a hole;

a pre-loadable mount pivotable relative to the lock, the pre-loadable mount comprising:

a yoke comprising two horizontal sections and a curvilinear section between the two horizontal sections, wherein the curvilinear section of the yoke extends in a direction perpendicular to the two horizontal sections and the curvilinear section of the yoke extends in a first plane parallel to the rear face of the door;

two bent rods, each bent rod comprising a first rectilinear section transversely extending from one of the two horizontal sections of the yoke, a second rectilinear section, and an angled bend between the first rectilinear section and the second rectilinear section, wherein the first rectilinear sections of the bent rods extend from a first end to a second end in a second plane perpendicular to the rear face of the door; and two pivots respectively extending from the bent rods, wherein the pivots are respectively inserted in the bores; and an adjusting element comprising a first section inserted into the hole and the second section placed against the curvilinear section of the yoke, wherein, when a portion of the frame is placed against the front face of the door, the angled bends of each of the bent rods abut the rear face of the door to clamp the door between the pre-loadable mount and the frame.

2. The lock assembly according to claim 1, wherein the hole is a screw hole, the first section of the adjusting element is a threaded section inserted in the screw hole, and the second section of the adjusting element is an enlarged head placed against the yoke.

3. The lock assembly according to claim 1, wherein the bores are coaxial.

* * * * *